United States Patent [19]

Minion

[11] Patent Number: 4,708,246
[45] Date of Patent: Nov. 24, 1987

[54] SHIPPING PACKAGE FOR RECORDING TAPE PANCAKES

[75] Inventor: Aaron A. Minion, St. Paul, Minn.

[73] Assignee: Minnesota Mining and Manufacturing Company, St. Paul, Minn.

[21] Appl. No.: 891,775

[22] Filed: Jul. 30, 1986

[51] Int. Cl.⁴ ............................................. B65D 85/67
[52] U.S. Cl. .................................. 206/394; 206/416; 206/497; 53/409; 53/442; 53/447
[58] Field of Search ............... 206/391, 394, 413, 415, 206/416, 497; 53/409, 442, 443, 447, 412

[56] References Cited

U.S. PATENT DOCUMENTS

| 4,081,151 | 3/1978 | Ender et al. | 242/68.5 |
| 4,340,188 | 7/1982 | Derendorf et al. | 206/394 X |
| 4,341,357 | 7/1982 | De Filippo | 206/394 X |
| 4,457,429 | 7/1984 | Huber et al. | 206/394 |
| 4,491,222 | 1/1985 | Gaccetta et al. | 206/394 |

Primary Examiner—William Price
Attorney, Agent, or Firm—Donald M. Sell; James A. Smith; David W. Anderson

[57] ABSTRACT

Pancakes of recording tape are packaged using stiff, expanded-plastic spacers, each having a web against which pancakes can rest in a stack of alternating pancakes and spacers. Each web terminates in an annular recess from which at least one deformable protuberance projects, and the core of each pancake is pinched between facing proturberances. A protective or reinforcing rim at the outer periphery of each web is sufficiently thin not to touch the rims so that each pancake can be held tightly against the adjacent webs while the stack is under axial compression, e.g., by a plastic shrinkwrap. By thus restraining both each pancake and its core, there is no core drop, upset or core rotation, problems besetting prior packages of pancakes of magnetic recording tape.

17 Claims, 4 Drawing Figures

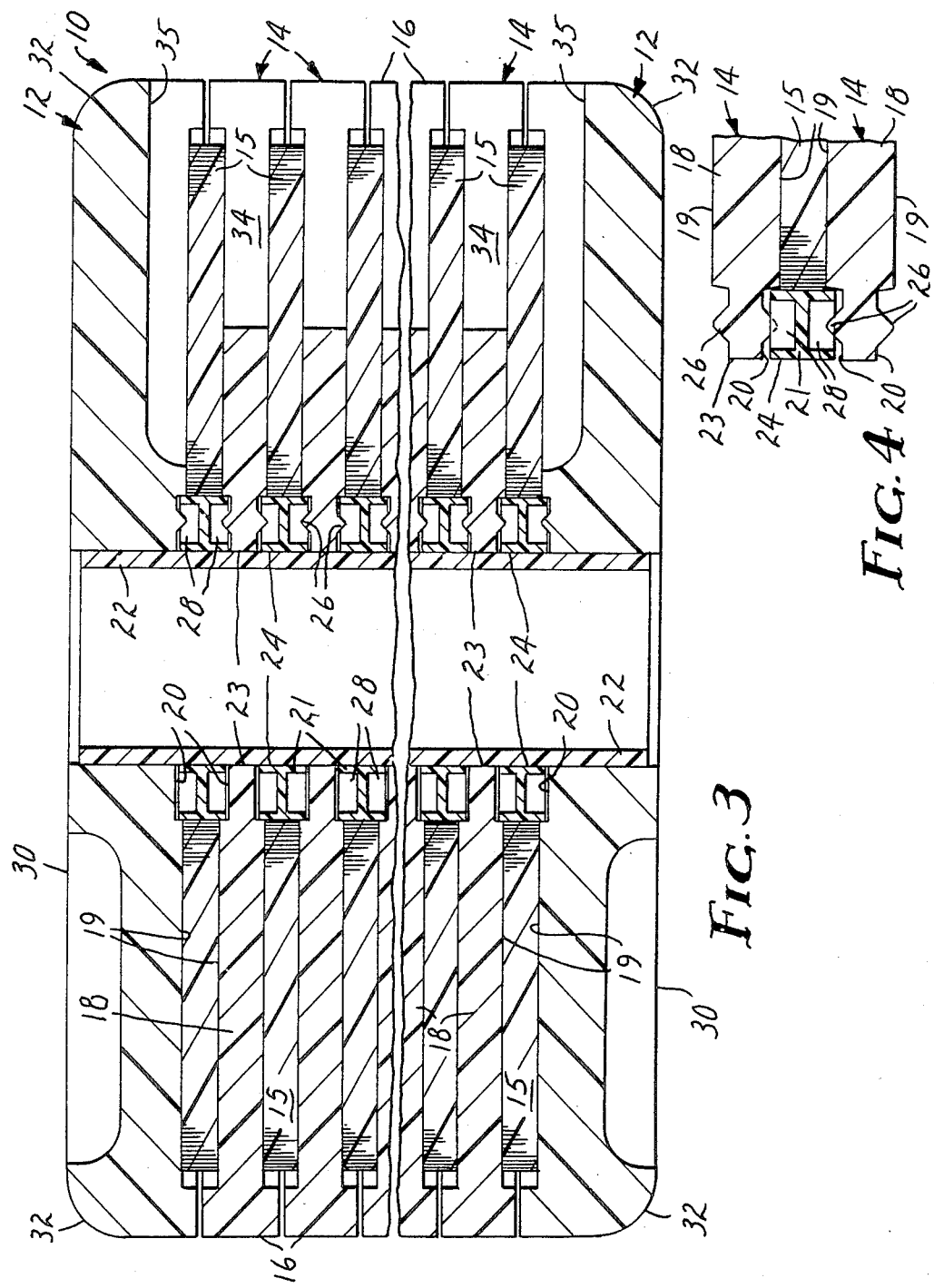

SHIPPING PACKAGE FOR RECORDING TAPE PANCAKES

BACKGROUND OF THE INVENTION

1. Field of the Invention

The invention concerns improvements in packages for shipping pancakes of recording tapes such as magnetic recording tape. By a "pancake" is meant a great length of recording tape wound upon a flangeless core, the name being derived from the appearance of the wound tape.

2. Description of the Related Art

Manufacturers of magnetic recording tapes often ship packages of the tape in pancakes of sufficient length that each pancake will fill a large number of cartridges or cassettes, e.g., video cassettes of the VHS and Betamax formats. A typical package of n pancakes (usually 6 or 8) employs n+1 identical, interlocking divider trays or spacers of stiff expanded plastic such as polystyrene. Each of the spacers has an octagonal outer rim, a web extending inwardly from the rim and having flat areas against which the pancakes can rest, an annular recess between the web and the hub to allow the width of the core to be greater than that of the pancake, and a central hub which fits into the central opening of the core. Each web and each annular recess is covered by a soft cushion of expanded plastic, and the cushion sometimes is held in place by an adhesive. The package is constructed by fitting the central opening of the flangeless core of one pancake onto the hub of the first spacer, then alternately stacking spacers and pancakes, after which extruded plastic bands are wrapped around the completed stack, and the wrapped stack is placed in a corrugated fiberboard box. In the wrapped stack, the rims of the spacers are pressed tightly against each other, but it usually is possible to slip a piece of paper between a side of each pancake and the facing web of the spacer. Problems that have been encountered during shipment include axial movement of the core relative to the pancake (called "core drop"), offsetting of a portion of the pancake (called "upset"), rotation of the core relative to the pancake, and transfer of cushion adhesive to the tape. Furthermore, the fiberboard box is a source of debris which might contaminate the recording tape.

The company to which this application is assigned has been packaging magnetic recording tape pancakes as follows. Into a corrugated fiberboard box is placed a corrugated plastic sheet having two plastic facings and a central aperture into which is inserted a plastic aligning cylinder. Over this is placed a soft cushion of expanded plastic which has a central aperture that fits over the aligning cylinder. This is followed by a magnetic recording tape pancake, another cushion, a pancake, a cushion, and then another corrugated plastic sheet. The same sequence is repeated until the box has been filled with at least 6 pancakes. Upon shipment, core drop and core rotation have sometimes been encountered.

To unpack each of the packages described above, it is customary to grasp the inner diameter of the core and the outer convolution of tape between the thumb and fingers of one hand, and upon doing so, the outer convolution sometimes is damaged by slipping off the pancake. This damage can be greatly reduced by lifting the tape using both hands, but it can be difficult to get a good grasp of the outer convolution with both hands simultaneously.

U.S. Pat. No. 4,081,151 (Ender et al.) concerns the problem of transporting pancakes of magnetic recording tape on flangeless cores. The patent observes that because the winding surface of the core is wider than the tape, it has previously been "necessary to insert rings of foam or cardboard between the stacked reels of tape for transport" and to insert "cardboard sleeves into the axial bores of the winding cores" (col. 1, lines 18-38). The Ender patent provides stackable, interlocking flangeless cores by which a number of pancakes of magnetic recording tape can be stacked more compactly than in the prior art "without the aid of inserts, cardboard sleeves or the like to fix the cores in position" (col. 3, lines 26-30). That reference to "inserts" apparently indicates the elimination of the prior need to insert rings of foam or cardboard between the pancakes, but since the patent drawing illustrates a small space between adjacent pancakes, there appears to be nothing to prevent axial shifting of, and consequent damage to, the pancake.

SUMMARY OF THE INVENTION

Like the typical prior package first described above, the invention concerns a package for pancakes of recording tape, each of which is wound upon a flangeless core. Also like the typical prior package, that of the invention comprises a plurality of stiff, expanded-plastic spacers, each having an outer rim and a web extending inwardly from the rim and having flat areas against which pancakes can rest in a stack of alternating pancakes and spacers. The web terminates in an annular recess which allows the core to be of greater width than the pancake. Both the prior and the novel packages employ means for maintaining the stack under axial compression.

The package of the invention differs from the typical prior package in that the floors or bases of the annular recesses of adjacent spacers in the stack have a spacing greater than the width of a core, on the base of each annular recess is at least one deformable protuberance that is axially separated from a facing protuberance in the stack by less than the width of a core, and the axial thickness of the rim is less than that of a web plus a pancake.

The protuberances should be formed to ensure that they are contacted by the core. Because most cores for magnetic recording tape have radial spokes, each protuberance is necessarily contacted by a spoke if its apex or crown extends along a circle of midpoints of the annular recess over a distance at least equal to the spacing between the midpoints of adjacent spokes. Preferably projecting from each of the annular recesses are several such arcuate protuberances, each of a length usually to be contacted by only one spoke which easily deforms the expanded-plastic material under moderate hand pressure. The deformability of the protuberances permits them to be penetrated by the spokes of the core to the extent necessary to accommodate off-center cores.

Because the axial thickness of the rim is less than that of a web plus a pancake, the rims do not contact each other in the package and thus do not restrict the pancakes from being pressed tightly against the webs of the spacers. Within that constraint, the rims should be as thick as possible in order to provide virtually continuous side walls, both to give a finished appearance to the novel package and also to afford the best possible protection to the packaged pancakes.

Preferably each spacer is formed with a central aperture into which is fitted a hollow, extruded plastic dowel to align the spacers. This facilitates forming the possible faces of each spacer with identical contours so that in building a stack, either face can be placed against the previous pancake. Instead of having a central aperture, each spacer could be formed with a hub to align the spacers as in the aforementioned typical prior package, but the hub might split when stressed, and the resulting debris could contaminate the recording tape.

Although the spacers could be placed at the top and bottom of the novel package, a stack of n pancakes preferably includes only n−1 spacers plus a pair of relatively thick end caps of stiff expanded plastic. The contour of the inner face of each end cap should be identical to that of a face of each spacer, but radial ribs preferably are formed in their outer faces, thus affording greater stiffness and consequently better resistance to the end caps bowing out when the package is subjected to physical shock. While the surfaces of the ribs should be flat to enhance stacking of the novel packages on pallets, the edges of the outer faces of the end caps should be rounded to facilitate uniform shrinkage of a plastic shrinkwrap. Furthermore, rounded edges better enable a plastic shrinkwrap to transmit compression axially from the full outer face of each end cap, thus holding the full areas of each pancake and its cores tightly against the spacers. A plastic shrinkwrap also serves to keep the pancakes clean.

The use of plastic shrinkwrap makes it feasible to form cutouts extending through the rim and adjacent portions of the web to provide better access to the pancakes. Only two cutouts 180° apart are preferred. This better access makes it easier for one to pick up each pancake with two hands, thus minimizing any danger of slippage of the outer tape convolution. The cutouts also enable one to view the interior of the package.

As in the aforementioned typical prior package, the exterior of each rim of each spacer preferably forms an equilateral polygon such as an octagon. This results in flat walls which enhance the integrity of a pallet-load of the novel packages and also better reinforce the walls of a box in which a package may be shipped. When one of the novel packages has been randomly dropped in testing, the additional thicknesses at those corners and at the ribs of the end caps better absorb the physical shock.

The spacers may be polystyrene which is economical and can be molded and expanded to develop surfaces that are so smooth as to appear to be shiny, especially when formed from relatively small beads such as "C-size" beads. Expanded crosslinked polyethylene would be as useful, but it does not provide sufficient advantages to justify its currently higher cost. Preferably the density of the expanded plastic of the spacers is from 30 to 50 kg/m$^3$ to provide adequate stiffness and toughness. When the recording tape is magnetic recording tape, the expanded plastic preferably incorporates an antistatic agent to minimize contamination of the packaged tapes.

The core vents in the flat areas of web preferably are slightly recessed to avoid contact between their flash and the pancake, which contact would otherwise result in dusting.

The novel package may be constructed by the following steps:

(1.) stacking alternately pancakes and stiff, expanded-plastic spacers, each having an outer rim and a web with flat areas against which pancakes can rest in a stack, the web terminating in an annular recess which allows the core to be of greater width than the pancake, there being at least one deformable protuberance on the base of each annular recess and the thickness of the rim being less than that of a web plus a pancake.

(2.) applying axial pressure to cause the cores to deform the adjacent protuberances, thus both pinching the cores between the protuberances and permitting each pancake to lie tightly against and be constrained by the adjacent webs, (3.) wrapping the stack to keep the package under axial compression.

When each spacer has a central aperture, step (1.) is supplemented by the step of fitting a dowel into the apertures to align the spacers.

BRIEF DESCRIPTION OF THE DRAWING

In the drawing, all FIGS. of which are schematic,

FIG. 3 is an enlarged cross section along line 3—3 of FIG. 1; and

FIG. 4 is an enlarged cross section along line 4—4 of FIG. 2.

Figure 1:
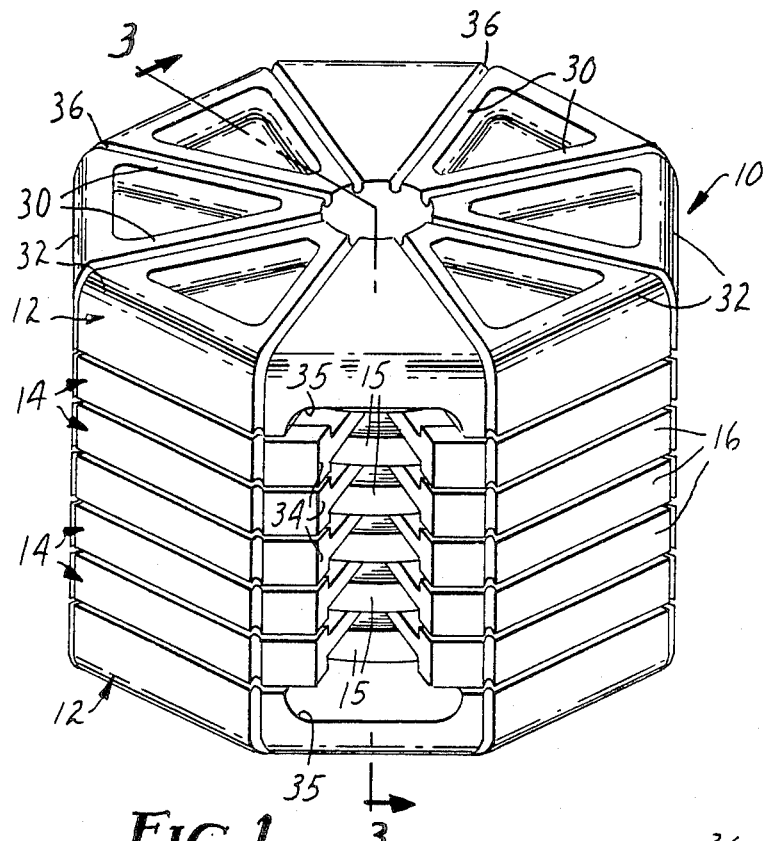
FIG. 1 is an isometric view of a package of the invention.
Figure 2:
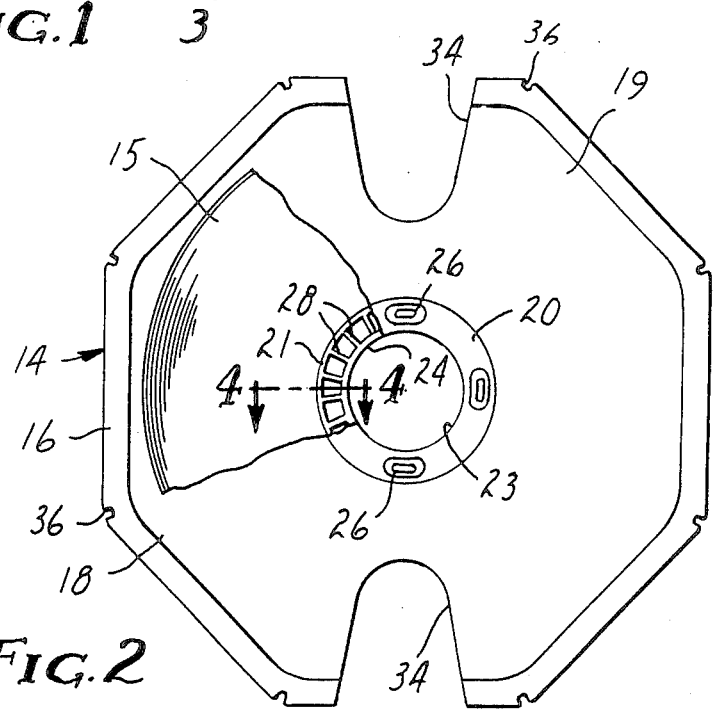
FIG. 2 is an elevation of a spacer of the package of FIGS. 1 and 2 on which a pancake, partially broken away, is resting.

The package 10 illustrated in FIGS. 1-4 includes a pair of identical end caps 12 and five identical spacers 14 of stiff expanded plastic which are alternately stacked with six pancakes 15 of magnetic recording tape. Each spacer 14 has an octagonal outer rim 16, and the rims are closely spaced to give the appearance of complete walls. Extending inwardly from the rim 16 is a web 18 with flat areas 19 against which the pancakes rest. The web terminates in an annular recess 20 that allows the core 21 on which the pancake is wound to be of greater width than the pancake. A hollow, extruded plastic dowel 22 fits into both the central apertures 23 of the spacers 14 and the central openings 24 in the cores 21 to keep the stack in axial alignment.

The floors or bases of the annular recesses 20 of adjacent spacers in the stack have a spacing greater than the width of a core 21. On the base of each annular recess 20 are four symmetrically positioned, arcuate, deformable protuberances 26 of rounded pyramidal shape, each extending along a circle midway between the radial extremities of the annular recess. The apex of each of the protuberances has sufficient length to contact at least one of the radial spokes 28 of a core 21, and hence each protuberance is deformed by being pressed against the spokes.

The outer face of each of the end caps 12 is formed with radial ribs 30 and rounded edges 32. The inner face of each of the end caps 12 is identical to that of each face of each spacer 14 and so includes a flat area 19, an annular recess 20, and rounded deformable protuberances 26.

Upon completing a stack of end caps 12, spacers 14, and pancakes 15 and applying sufficient axial compression to deform the protuberances 26 and force the pancakes against the flat areas 19 of the webs 18, the entire package is wrapped in heat-shrinkable plastic film (transparent and hence not shown) which shrinks tightly to maintain the axial compression and also to prevent relative movement of parts of the package. By thus maintaining axial compression, the webs 18 restrain the pancakes against axial movement, while the deformed protuberances 26 restrain the cores 22 against axial movement. These restraints together effectively prevent core drop, upset, and core rotation in spite of shocks such as may be caused by dropping the package on concrete.

Two cutouts 34 (180° apart) extend centrally through flat sides of the rim 16 and adjacent portions of web 18 of the spacers 14. There are larger cutouts 35 in inner portions of the end caps 12. The cutouts provide better access to the outer convolution of each pancake after removing the overlying end cap and spacers. The cutouts also afford a good view of the pancakes of an unopened package through the transparent shrinkwrap. Notches 36 formed in the corners of the rims 16 and across the radial ribs 30 of the end caps permit one to cut off the plastic shrinkwrap with a knife without touching the end caps or spacers. If a spacer were nicked by a knife, this might dislodge particles that could contaminate the tapes.

EXAMPLE

The package illustrated in FIGS. 1-4 has been employed to package six pancakes of video cassette recording tape, ½ inch (1.27 cm) in width wound on cores having an outer diameter of 11.4 cm and an inner diameter of 7.6 cm. Each pancake had a diameter of 37 cm. The dowel was extruded polystyrene having an outer diameter of 7.5 cm and an inner diameter of 6.9 cm. Each spacer was expanded polystyrene molded using C-size beads which pass a sieve having 0.50-mm openings before being expanded. The density of the molded expanded polystyrene was 2.5 lbs/ft$^3$ (40 kg/m3). Each spacer had the following dimensions:
Thickness of web 18 : 1.90 cm
Thickness at annular recess: 0.95 cm
Height of protuberance 26 : 0.48 cm
Length of apex of protuberance 26 : 20° of arc
Thickness of rim 16 : 3.01 cm
Minimum diameter at rim 16 : 37.5 cm
Radial width of rim 16 : 1.27 cm
Diameter of central aperture 23 : 7.66 cm
The thickness of the end caps was 3.65 cm at the ribs and 2.07 cm between the ribs. The width of each rib in the circumferential direction was 2.54 cm. The radius of each of the rounded edges was ¾ inch (1.9 cm).

Because the core had 24 spokes, one every 15° of arc, every protuberance was in contact with at least one spoke.

Over each stack was wrapped biaxially oriented polypropylene film (150-gauge; 0.038 mm thickness) which then was sealed along a line midway between the end caps and heated to shrink tightly, thus encasing the stack except for a few vents.

A number of these packages were dropped six times at different attitudes from a height of 60 cm onto a concrete floor. Some of the packages were held at 52° C. and some at −18° C. for 72 hours followed by 48 hours at room temperature before being dropped onto the concrete. None of these showed any damage, in spite of the fact that the pancakes of packages which had been heated had loosened to the extent that they sagged when lifted by their edges from the package. Additional packages were vibrated at 1 G input, 13 Hz for 15 minutes at room temperature and then dropped six times from 60 cm onto the concrete floor. Even though the vibration had loosened the pancakes, none of them showed any damage from being dropped.

Additional packages were tested by being stacked and bound onto pallets, 3×3 packages in each of 3 levels. The pallets were shipped by trucks over distances of at least 400 km and then returned. Upon opening the test packages, none of the pancakes showed any damage.

We claim:

1. A package for pancakes of recording tape, each wound upon a flangeless core, said package comprising a plurality of stiff, expanded-plastic spacers, each having an outer rim and a web with flat areas against which pancakes can rest in a stack of alternating pancakes and spacers, the web terminating in an annular recess which allows the core to be of greater width than the pancake, there being means for maintaining the stack under axial compression, wherein the improvement comprises:
   the base of the annular recesses of adjacent spacers in the stack are spaced greater than the width of a core,
   on the base of each annular recess is at least one deformable protuberance that is spaced from a facing protuberance in the stack by less than the width of a core, and
   the thickness of the rim is less than that of a web plus a pancake.

2. A package for pancakes as defined in claim 1 wherein each core is formed with a central opening, each spacer is formed with a central aperture, and a dowel fits into said openings and apertures to align the spacers.

3. A package for pancakes as defined in claim 2 wherein opposite faces of each spacer have identical contours.

4. A package for pancakes as defined in claim 3 wherein the stack includes n pancakes, n-1 spacers, and a pair of end caps of stiff expanded plastic, the contours of the inner face of each end cap being identical to that of each face of each spacer.

5. A package for pancakes as defined in claim 1 wherein the rims are sufficiently thick to provide virtually continuous side walls.

6. A package for pancakes as defined in claim 1 having a plastic shrinkwrap.

7. A package for pancakes as defined in claim 6, the rims of which are formed with aligned exterior notches to facilitate cutting and removal of the shrinkwrap.

8. A package for pancakes as defined in claim 7 wherein each spacer is formed with two cutouts extending through opposite flat sections of the rim and adjacent portions of the web to provide better access to the pancakes.

9. A package for pancakes as defined in claim 1 wherein the spacers are expanded polystyrene.

10. A package for pancakes as defined in claim 9 wherein the density of the expanded plastic is from 30 to 50 kg/m$^3$.

11. A package for pancakes as defined in claim 1 wherein each core has radial spokes and there are four arcuate protuberances symmetrically positioned with their apices extending along a circle of midpoints of the annular recess, each protuberance extending over a distance at least equal to the spacing between midpoints of adjacent spokes.

12. A package for pancakes as defined in claim 11 wherein each of the protuberances is of a length usually to be contacted by only one spoke of the core.

13. A package for pancakes as defined in claim 2 wherein each of the protuberances is of rounded pyramidal shape.

14. A package for pancakes as defined in claim 1 wherein the flat areas of the webs are formed with recessed core vents.

15. Method of packaging a plurality of pancakes of magnetic recording tape, each wound upon a flangeless core which has a central opening, said method comprising the steps of
   (1.) stacking alternately pancakes and stiff, expanded-plastic spacers, each having an outer rim and a web with flat areas against which the pancakes can rest in a stack, the web terminating in an annular recess which allows the core to be of greater width than the pancake, there being at least one deformable protuberance on the base of each annular recess, and the thickness of the rim being less than that of a web plus a pancake,
   (2.) applying axial pressure to cause the cores to deform the adjacent protuberances, thus both pinching the cores between the protuberances and permitting each pancake to lie tightly against and be constrained by the adjacent webs,
   (3.) wrapping the stack to keep the stack under axial compression.

16. Method as defined in claim 14 wherein step (3) comprises wrapping and shrinking a shrinkable plastic film around the stack.

17. Method as defined in claim 14 wherein each core has a central opening and each spacer has a central aperture, and step (1) is supplemented by the step of fitting a dowel into said openings and apertures to align the spacers.

* * * * *

UNITED STATES PATENT AND TRADEMARK OFFICE
CERTIFICATE OF CORRECTION

PATENT NO. : 4,708,246
DATED : November 24, 1987
INVENTOR(S) : Aaron A. Minion & David R. Remus It is certified that error appears in the above-identified patent and that said Letters Patent is hereby corrected as shown below:

Title page:

[75] Inventor, should read as follows:
    Aaron A. Minion, St. Louis Park;
    David R. Remus, Afton, both of Minn.

Column 5, line 59, "attitudes" should read -- altitudes --.

Claim 13, (column 7, line 4), "2" should read -- 12 --.

Signed and Sealed this

Third Day of May, 1988

Attest:

DONALD J. QUIGG

*Attesting Officer*

*Commissioner of Patents and Trademarks*